United States Patent [19]

Lazzaro et al.

[11] Patent Number: 5,878,594
[45] Date of Patent: Mar. 9, 1999

[54] STRUCTURE FOR SUPPORTING A RADIATOR AND FIXING IT TO THE BODY OF A VEHICLE

[75] Inventors: Maurizio Lazzaro; Luigi Cristante, both of Turin, Italy

[73] Assignee: Magneti Marelli Climatizzazione S.p.A., Turin, Italy

[21] Appl. No.: 55,959

[22] Filed: Apr. 7, 1998

[30] Foreign Application Priority Data

Apr. 8, 1997 [IT] Italy .................................. TO97A0294

[51] Int. Cl.⁶ ...................................................... F25B 37/00
[52] U.S. Cl. .................................. 62/474; 62/512; 62/509
[58] Field of Search ........................................ 62/512, 509

[56] References Cited

U.S. PATENT DOCUMENTS 5,219,016  6/1993  Bolton et al. .

FOREIGN PATENT DOCUMENTS

| 0652150 | 5/1995 | European Pat. Off. . |
|---|---|---|
| 3922814 | 4/1990 | Germany . |
| 4137038 | 6/1993 | Germany . |
| 19520870 | 12/1996 | Germany . |
| 29719733 | 12/1997 | Germany . |

Primary Examiner—Henry Bennett
Assistant Examiner—Mat Shulman
Attorney, Agent, or Firm—Sughrue, Mion, Zinn, Macpeak & Seas, PLLC

[57] ABSTRACT

A structure for supporting an electric fan and fixing it to the radiator of a vehicle having climate control, comprising a unitary injection-moulded plastics material body including a rectangular frame, a plurality of arms for fixing the structure to the body of a vehicle, a housing for receiving a rotatable cooling fan and a mount for the electric motor for driving the fan. The structure also includes a support surface and a seat for supporting and fixing a dehydration filter forming part of the climate control system of the vehicle.

5 Claims, 1 Drawing Sheet

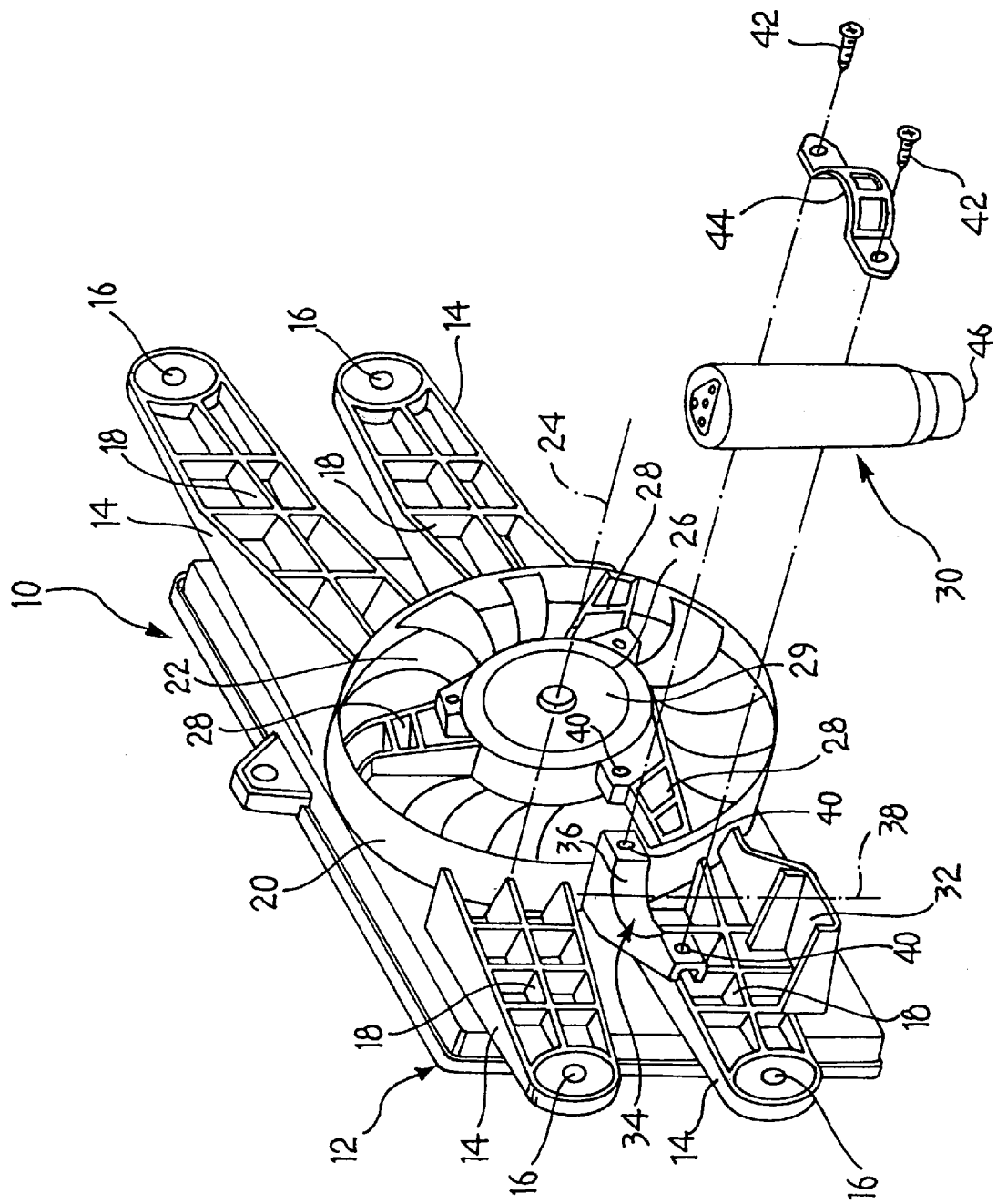

STRUCTURE FOR SUPPORTING A RADIATOR AND FIXING IT TO THE BODY OF A VEHICLE

BACKGROUND OF THE INVENTION

The present invention relates to a structure for supporting an electric fan and fixing it to a radiator of a vehicle with air conditioning or climate control.

In general, support structures of the type specified above comprise a unitary body injection-moulded from plastics material, in which are integrally formed a rectangular frame, a plurality of arms for fixing the structure to the radiator of the vehicle, a mount for the cooling fan and a support for an electric motor for operating the fan.

The problem on which the present invention is based is that of positioning and fixing the dehydration filter inside the engine compartment. The dehydration filter forms part of the climate control system of the vehicle and is constituted by a body with a substantially cylindrical outer surface. The dehydration filter must be connected to the other members forming the climate control system, thereby often requiring lengthy ducts for connection to the other members, resulting in relatively great costs and size.

SUMMARY OF THE INVENTION

With the object of resolving the aforesaid disadvantages, the subject of the present invention is a structure for supporting an electric fan and fixing it to the radiator of a vehicle equipped with climate control, characterised in that it includes means for supporting and fixing a dehydration filter forming part of the vehicle's climate control system, the said means being integrally formed with the unitary body of the support and fixing structure.

Thanks to this arrangement, it is possible to reduce the size of the ducts connecting the dehydration filter to the other members of the climate control system. The number of parts required to mount the dehydration filter is also reduced, thereby cutting costs.

Further characteristics and advantages of the present invention will become apparent from the detailed description which follows, provided purely by way of non-limitative example, with reference to the appended drawing which shows a perspective view of a support and fixing structure according to the present invention.

DETAILED DESCRIPTION OF THE INVENTION

With reference to the drawing, a unitary injection-moulded plastics material body is indicated 10, constituting a structure for supporting an electric fan 29 and fixing it to the radiator of a vehicle. The unitary body 10 includes a rectangular frame 12 acting as spacer between the radiator (not illustrated), forming part of the cooling system of the internal combustion engine of the vehicle, and the electric fan 29. If the vehicle is fitted with a climate control system, a condenser (not illustrated) is generally arranged in front of the radiator, positioned so that the flow of air drawn in by the electric fan passes through it as well.

The rectangular frame 12 is formed integrally with a plurality of arms 14 having holes 16 at their free ends for fixing the body 10 to the radiator of the vehicle. The arms 14 preferably have stiffening ribs 18 which are also integrally formed.

The unitary body 10 also has a circular housing 20 in which a cooling fan 22 is mounted for rotation about an axis 24. The circular housing 20 has a central cylindrical support 26 connected to the cylindrical wall forming the housing 20 by a series of radial arms 28. The central support 26 is provided to fix the electric motor driving the fan 22 to the body 10.

The structure of the invention has means for supporting and fixing a dehydration filter 30 forming part of the climate control system of the vehicle. These means are also formed integrally with the unitary body 10 and include a flat support surface 32 which, when the structure is in its assembled position, extends horizontally. Above the support surface 32, a seat 34 is formed, also integrally with the body 10, having a cylindrical contact profile 36, the axis 38 thereof extending substantially perpendicular to the bearing surface 32. The radius of curvature of the profile 36 is substantially equal to the radius of the outer casing of the dehydration filter 30. The seat 34 has a pair of holes 40 engaged by two screws 42 which hold a fixing band 44 against the seat 34 for fixing the filter 30 securely to the seat 34. Upon assembly, the flat lower surface 46 of the filter 30 rests on the support surface 32. The fixing of the filter 30 is then completed by fitting the band 44 and tightening the screws 42.

The band 44 may be made of plastic material and may advantageously be moulded in the same mould as the unitary block 10. A shape corresponding to the band 44 could be formed in an area of the mould not required for the moulding of the body 10. The band 44 could thus remain attached to the body 10 until mounting of the filter 30 takes place, thereby avoiding the need to handle a separate part. Upon mounting the filter 30, the band 44 is detached from the rest of the body 10 and the filter is secured by means of the screws 42.

The arrangement of the present invention enables the dehydration filter 30 to be fitted very close to the condenser, so that the size of the connecting ducts required to connect the filter 30 to the climate control system (not shown) is reduced to the minimum. In addition, with the system of the invention, no auxiliary parts are required for fixing the filter 30, since all the necessary components, except of course for the screws 42, are formed integrally with the unitary body 10.

What is claimed is:

1. A structure for supporting an electric fan and fixing it to the radiator of a vehicle fitted with climate control system, comprising a unitary, injection-moulded plastics material body which includes a rectangular frame, a plurality of arms for fixing the structure to the radiator of the vehicle, a housing for rotatably housing a cooling fan and a support for an electric motor for operating the said fan, and means for supporting and fixing a dehydration filter forming part of a climate control system of a vehicle, the said means being integrally formed with the unitary body.

2. A structure according to claim 1, wherein the said means for supporting and fixing the filter include a flat support surface which, in the assembly position of the structure, extends horizontally.

3. A structure according to claim 2, wherein the said means for supporting and fixing the filter include a seat with a cylindrical profile, the axis thereof extending substantially perpendicular to the said flat surface.

4. A structure according to claim 3, including a band for fixing with screws to the said seat so as to secure the filter in the seat.

5. A structure according to claim 4, wherein the said fixing band is formed integrally with the unitary body and is intended to be separated therefrom at the time of fixing the filter to the seat.

5,878,594

3

* * * * *

4

5

10

15

20

25

30

35

40

45

50

55

60

65